(12) United States Patent
Volokh et al.

(10) Patent No.: US 8,221,036 B2
(45) Date of Patent: Jul. 17, 2012

(54) CHATTER-RESISTANT END MILL

(75) Inventors: Vladimir Volokh, Ma'alot (IL); Sergei Boulakhov, Nahariya (IL); Leonid Sharivker, Nahariya (IL); Shay Zeidner, Cabri (IL); Vladimir Galipko, Nahariya (IL)

(73) Assignee: Hanita Metal Works, Ltd., Shlomi (IL)

( * ) Notice: Subject to any disclaimer, the term of this patent is extended or adjusted under 35 U.S.C. 154(b) by 147 days.

(21) Appl. No.: 12/376,590

(22) PCT Filed: Aug. 6, 2007

(86) PCT No.: PCT/IL2007/000978
§ 371 (c)(1),
(2), (4) Date: Jul. 21, 2009

(87) PCT Pub. No.: WO2008/018062
PCT Pub. Date: Feb. 14, 2008

(65) Prior Publication Data
US 2010/0178119 A1    Jul. 15, 2010

(30) Foreign Application Priority Data
Aug. 7, 2006 (IL) .......................... 177336

(51) Int. Cl.
*B23C 5/10* (2006.01)
(52) U.S. Cl. .......................... 407/54; 407/63
(58) Field of Classification Search .............. 407/34, 407/53, 54, 56, 60, 61; 408/230, 227
See application file for complete search history.

(56) References Cited

U.S. PATENT DOCUMENTS

| | | | |
|---|---|---|---|
| 3,156,154 A | 11/1964 | Stanaback | |
| 3,775,819 A * | 12/1973 | Ribich | 407/53 |
| 4,285,618 A | 8/1981 | Shanley, Jr. | |
| 4,963,059 A | 10/1990 | Hiyama | |
| 6,164,877 A | 12/2000 | Kamata et al. | |
| 6,168,355 B1 | 1/2001 | Wardell | |
| 6,652,203 B1 * | 11/2003 | Risen, Jr. | 408/225 |
| 6,899,494 B2 * | 5/2005 | Walrath | 407/54 |
| 6,991,409 B2 * | 1/2006 | Noland | 407/63 |
| 7,001,113 B2 * | 2/2006 | Flynn et al. | 407/54 |
| 7,153,067 B2 * | 12/2006 | Greenwood et al. | 407/53 |
| 7,214,006 B2 * | 5/2007 | Flynn | 407/53 |
| 7,223,053 B2 * | 5/2007 | Flynn | 407/53 |
| 7,306,408 B2 | 12/2007 | Wells et al. | |
| 7,367,754 B1 * | 5/2008 | Greenwood et al. | 407/63 |

(Continued)

FOREIGN PATENT DOCUMENTS

DE    11 77 904 B    9/1964

(Continued)

OTHER PUBLICATIONS

English translation of International Search Report PCT/IL2007/000978.

(Continued)

*Primary Examiner* — Boyer D Ashley
*Assistant Examiner* — Sara Addisu
(74) *Attorney, Agent, or Firm* — Larry R. Meenan

(57) ABSTRACT

A chatter-resistant end mill and a method of making such an end mill, in which the teeth of the end mill are unequally spaced apart to substantially reduce or eliminate vibrations produced during cutting of a work piece.

10 Claims, 4 Drawing Sheets

U.S. PATENT DOCUMENTS

| | | |
|---|---|---|
| 2003/0118411 A1 | 6/2003 | Flynn et al. |
| 2004/0057803 A1 | 3/2004 | Walrath |
| 2004/0120777 A1* | 6/2004 | Noland .................. 407/63 |
| 2004/0258490 A1* | 12/2004 | Walrath .................. 407/54 |
| 2005/0105973 A1 | 5/2005 | MacArthur |
| 2007/0243030 A1* | 10/2007 | Staedt et al. .................. 407/61 |

FOREIGN PATENT DOCUMENTS

| | | | |
|---|---|---|---|
| FR | 2 875 722 A | | 3/2006 |
| JP | 01 135408 A | | 5/1989 |
| RU | 2010682 C1 | | 4/1994 |
| SU | 558781 A1 | | 5/1977 |
| SU | 631 271 A1 | | 11/1978 |
| SU | 1701440 A1 | | 12/1991 |
| WO | WO 94/21412 A | | 9/1994 |
| WO | 2006/028887 A1 | | 3/2006 |

OTHER PUBLICATIONS

English translation of International Preliminary Report on Patentability PCT/IL2007/000978.
Supplementary European Search Report EP 07 79 0033.
International Search Report PCT/IL2007/000978.
"End mills with conical shank", State Standard 17026-71, M., 1986 (D1), p. 16, p. 21, p. 23, p. 25.
Carasev V.I., "End and cylindrical mills with irregular circular pitch" CBTI, M., 1959 (D2), 3 pp.
Russian Patent Office, Official Action, 5 pp.

* cited by examiner

CHATTER-RESISTANT END MILL

BACKGROUND

The present application relates to milling cutters. More particularly, there is provided an end mill configured to substantially reduce or eliminate vibrations of the cutter itself and of the work piece.

The milling process is by its very nature a non-continuous form of machining. A wide range of cutters are available "off the shelf," and it is up to the user to select the type required. The cutter used may have up to about 20-30 teeth, depending primarily upon the diameter of the cutter and its type, and on further factors, such as the material of which the cutter is constructed, the material of the work piece, whether the cutting operation is for finishing or roughing, the required or desired cutter life, and the like.

As can be expected from any non-continuous type of machining, vibrations are generated by milling, and such vibrations may range in amplitude from negligible to severe. During machining with an end mill, the tool is generally subject to both bending and torsional forces; these being of an intermittent nature due to a tooth contacting or ceasing to contact the face being machined. As those visiting a working machine shop are aware, these vibrations generate sounds which are in frequencies and amplitudes to which the human ear is sensitive.

The work piece being machined is also set into vibration, the nature of which will be significant for a large hollow item and will be of no consequence for a solid well-supported and securely clamped work piece.

Noticeable vibration, sometimes referred to as chattering, is detrimental to machining not only because of the generated noise. Such vibrations are directly responsible for a poor surface finish on the work piece, as well as for a shortening of the life of the cutter and reduced accuracy in machining.

Undesired vibrations may be present in the cutting tool, or in the work piece, and can be present in both.

A severe problem arises when the frequency of vibration of the cutter corresponds or is proximate to the natural frequency of the work piece, causing resonance. The resulting greatly increased amplitude makes it impossible to produce acceptable work and the generated sound can be most disturbing. Breakage of a cutter such as an end mill or spoilage of the work piece is also likely. The use of a more rigid cutter and the application of additional work piece supports would increase vibration frequency to a safe and non-audible level and greatly reduce amplitude, but these desirable steps are not always possible.

Increasing the cutter speed is also often impractical because tool life will be substantially shortened in practice.

The use of helical-tooth end mills, similarly to helical gearing, is helpful in abating but not solving these problems.

The state of the prior art can be assessed from a review of relevant U.S. Patents.

In U.S. Pat. No. 4,285,618, Stanley, Jr. claims a milling cutter shown as an end mill provided with serrations on the cutting edges. The serrations are axially off-set in relation to a neighboring tooth. Whether or not such a cutter will reduce vibrations would need to be proved by tests.

In U.S. Pat. No. 4,963,059, Hiyama proposes an end mill wherein the flute helix angle is not the same for each flute. However, as the peripheral cutting edges are equally spaced around the cutter periphery in at least one position, the proposed design would provide only a partial solution. Also, a problem would arise during manufacture of said end mill as the metal available for formation of the tooth would vary significantly along the length of the cutter.

In U.S. Pat. No. 6,168,355, Wardell describes an end mill having a main body and ears extending outward from the point of the tool. Means for reducing vibration are not provided.

In U.S. Pat. No. 6,164,877, Kamata et al. disclose a formed shape cutter intended for cutting specially-shaped grooves. The relief angle of the tooth remains constant along the axial length of the tool. No anti-chatter means are seen.

Wardell, in a further U.S. Patent, discloses an end mill having a primary helical flute defining a low-angle cutting surface and a secondary flute for a high angle cutting surface. This arrangement will not solve the problems relating to tool vibrations.

A further end mill having a variable helix flute is seen in published U.S. Patent Application 2005/0105973 by MacArthur. The teeth of the cutter are equally spaced around the tool periphery.

From the prior art it is evident that no satisfactory solution is yet known.

OBJECT

It is therefore one of the objects of at least one embodiment to obviate the disadvantages of prior art cutters and to provide an end mill which will eliminate or substantially reduce periodic vibrations which are detrimental to both the tool and the work piece.

It is a further object of at least one embodiment to disclose a tool design which can be easily programmed for manufacture, and can be manufactured at a cost only slightly higher than a conventional end mill.

SUMMARY

The above objects may be achieved in at least one embodiment of a chatter-resistant end mill, shell mills and burs comprising a shank portion and at least one cutting portion divided into a plurality of teeth by flutes disposed between said teeth, each tooth having at least one cutting edge, and wherein a first angle separating said cutting edge of a first tooth from the cutting edge of a tooth nearest the first tooth in a clockwise direction is different from a second angle separating said cutting edge of said first tooth from the cutting edge of a tooth nearest the first tooth in an anti-clockwise or counterclockwise direction. For example, in an embodiment having only two teeth, the first angle separating the cutting edge of the first tooth from the cutting edge of the second tooth (which is nearest the first tooth since the second tooth is the only other tooth) in a clockwise direction is different from a second angle separating the cutting edge of the first tooth from the cutting edge of the second tooth in a counterclockwise direction. In an embodiment having three or more teeth, the first angle separating the cutting edge of a first tooth from the cutting edge of a second tooth nearest the first tooth in a clockwise direction is different from a second angle separating the cutting edge of the first tooth from the cutting edge of a third tooth nearest the first tooth in a counterclockwise direction.

In one embodiment there is provided an end mill wherein the difference between said first and said second angles is in the range of 0.2-60 degrees.

In another embodiment there is provided an end mill wherein the difference between said first and said second angles is in the range of 0.2-30 degrees.

In another embodiment there is provided an end mill wherein the width and depth of all flutes in said cutting portion is equal.

In a further embodiment there is provided an end mill or burs wherein a flute is disposed between two adjacent teeth, said adjacent teeth being spaced apart at an angle exceeding the angle which would result from equal angular spacing, said flute being wider and deeper than a second flute appropriate to an equally-spaced pair of adjacent teeth.

In yet another embodiment there is provided an end mill or burs wherein a flute is disposed between two adjacent teeth, said adjacent teeth being spaced apart at an angle less the angle which would result from equal angular spacing, said flute being narrower and shallower than a second flute appropriate to an equally-spaced pair of adjacent teeth.

In a further embodiment there is provided an end mill, shell mills and burs wherein the flute helix angle is constant along each tooth and constant from tooth to tooth in the cutting part of the end mills, shell mills and burs.

In a further embodiment there is provided an end mill, shell mills and burs wherein the flute helix angle is variable along each tooth and same from tooth to tooth in the cutting part of end mills, shell mills and burs.

In yet a further embodiment there is provided an end mill wherein at least one group of said cutting edges is displaced from the equally-spaced position and at least one further group has cutting edges positioned in an equally-spaced configuration.

It will thus be realized that the cutter of at least one embodiment serves to break the regularity of the input force causing the undesired vibration both in the end mill and in the work piece. Resonance occurs when the natural frequency of the cutter or of the work piece corresponds or is proximate to the frequency of the induced vibration. The end mill of at least one embodiment having irregularly spaced cutting surfaces will apply the cutting force in an irregularly timed cycle, the result of which is the inhibition of resonance, and greatly reduced vibration at any frequency. Vibration control provides the desired benefits of a better surface finish, longer tool life and, of course, less noise.

Theoretical calculations of vibration frequencies for cutters and work pieces are difficult, because of the complex form of the tool and often also of the work piece and because the end mill is stressed both torsionally and by bending forces. Measurement of vibration while machining a test piece is however a simple task. Furthermore, vibration input is easily calculated on the basis of number of teeth and the speed (RPM) of the machine spindle. Thus a simple test will indicate which tool diameter and the benefits of uneven peripheral spacing of the teeth in at least one embodiment are not limited to conditions of resonance. Whatever the natural frequency, unwanted vibration is subdued by the uneven peripheral positioning of the cutting edges. The reduction of vibrations to minimum amplitude is a prerequisite for correct and economic machining by any machine tool.

A prototype of a cutter made according to at least one embodiment was tested with the following results:

Tools:
Solid Carbide End Mill Diameter 12 mm:
1-5 flutes with unequal cutting edges space dividing according to an embodiment.
2-5 flutes with equal cutting edges space dividing.
Material: St. Steel 316L
Cutting Conditions:
Slotting Application: depth of cut—12 mm (1D)

| Feed mm/t | # of tools | Speed m/min 50 | 60 | 70 | 80 | 90 |
|---|---|---|---|---|---|---|
| 0.05 | #1 - Vibrations | No | No | No | No | No |
| 0.05 | #2 - Vibrations | Slow | Medium | High | High, Chipping | High, Broken |

| Speed m/min | # of tools | Feed, mm/t 0.03 | 0.04 | 0.05 | 0.06 | 0.07 |
|---|---|---|---|---|---|---|
| 80 | #1 - Vibrations | No | No | No | No | No |
| 80 | #2 - Vibrations | Slow | High | High, Chipping | High, Broken | High, Broken |

Thus it was seen that the end mill according to at least one embodiment achieved the stated objects:

5 flutes Solid Carbide End Mills diameter 12 mm with unequal cutting edges space dividing according to one embodiment prevent vibration in wide range of the speeds: 50-90 m/min and feeds: 0.03-0.07 mm/teeth.

According to at least one possible embodiment, the spacing between two teeth of a cutter or end mill is adjusted by experiment to substantially or at least partially cancel out the vibration which is caused by the spacing between other teeth. To further explain by way of example, in an end mill with five cutting teeth, each pair of adjacent teeth defines an angular measurement there between. As discussed above, the angular measurements are not equal for all five pairs of cutting teeth in order to substantially reduce or eliminate resonance caused by vibrations. In order to achieve such a substantial reduction or elimination of vibrations, the spacing of the cutting teeth, and thus the angular measurement there between, can be selected during design of the end mill for each pair of teeth. If, for example, an angular spacing of at least one pair of teeth is believed to have or actually has a canceling effect on vibrations caused by a different angular spacing of another pair of teeth for an end mill for a particular type of machining, then the end mill could be designed accordingly. The end mill could then be tested on a test work piece, wherein the vibrations and/or resonance could be measured and observed to determine the degree of the canceling effect. If the canceling effect is not as desired, then the angular spacing could be adjusted until the desired canceling effect is obtained. In this manner, an end mill or cutter could be designed that does not just vary the vibrations from cutting tooth to cutting tooth to avoid resonance, but rather utilizes the vibrations caused by the spacing of one or more pairs of teeth to at least partially cancel out, and thus substantially reduce or eliminate, the vibrations caused by the spacing of one or more other pairs of teeth. According to at least one embodiment, the optimum or desired spacing which most effectively cancels out vibrations could possibly be determined by theoretical calculations, measurement of the frequencies, or a combination thereof.

BRIEF DESCRIPTION OF THE DRAWINGS

The embodiments will now be described further with reference to the accompanying drawings, which represent exemplary embodiments. Structural details are shown only as far as necessary for a fundamental understanding thereof. The described examples, together with the drawings, will make apparent to those skilled in the art how further forms of the embodiments may be realized.

In the drawings.

DETAILED DESCRIPTION OF THE DRAWINGS

Figure 1:
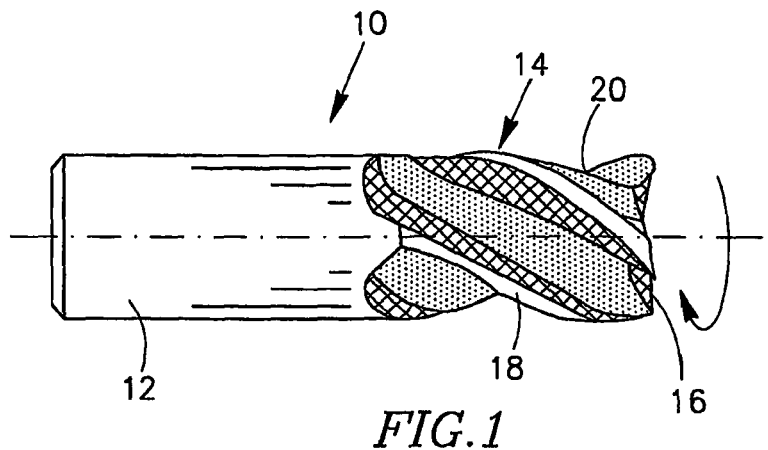
FIG. 1 is an elevational view of an end mill according to at least one embodiment.

There is seen in FIG. 1 a chatter-resistant end mill 10, comprising a shank portion 12 for gripping by a machine tool. Cutting portions 14, 16 are seen both on the side and the end face. The cutting portion 14 is divided into four teeth 18 by four flutes 20 disposed between the teeth 18.

Figure 2:
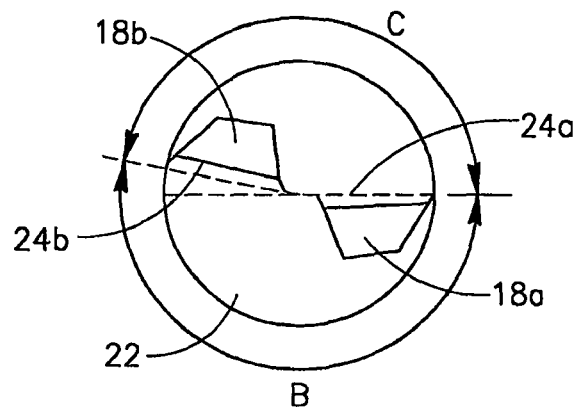
FIG. 2 is an end view of a two-tooth end mill according to at least one embodiment.

FIG. 2 shows a two-tooth end mill 22, and there is seen the end cutting edge 24 of each tooth 18 at the cutting portion 16. A first angle B and a second angle C separate the two cutting edges 24a of a first tooth 18a from the cutting edge 24b of the second tooth. The difference between the angles A and B is about 30 E in the diagram but can be as high as 60 E for end mills if desired. It should be noted that A+B=360 E.

With reference to the rest of the figures, similar reference numerals have been used to identify similar parts.

Figure 3:
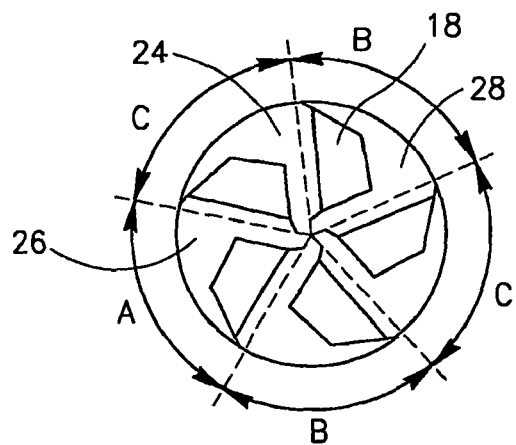
FIG. 3 is an end view of a five-tooth end mill according to at least one embodiment.

FIG. 3 illustrates a five tooth end mill 26 wherein the difference between the first and the second angles B, C is in the range of 0.2-30 degrees. The smaller differential is suitable for cutters having 5 teeth (or more) as seen in the figure. There are two pairs B C of cutting edge irregular spacing and a single span A which is the angle resulting from equal spacing, i.e. 72 E in the example seen. The same flute profile 28 is used for all teeth for simplicity of manufacture.

Figure 4:
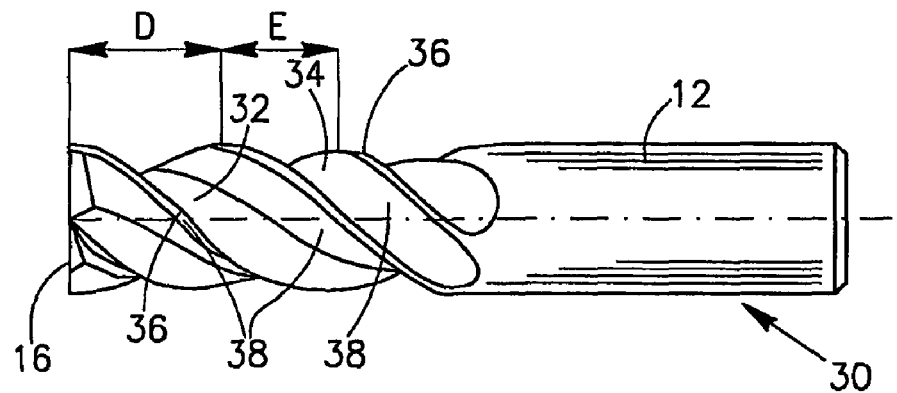
FIG. 4 is an elevational view of an end mill according to at least one embodiment, showing flute variation.

Turning now to FIG. 4, there is depicted an end mill 30 showing different flutes 32, 34 disposed between cutting edges 36 of adjacent teeth 38. Adjacent teeth 38 are spaced apart at an angle B exceeding the angle A which would result from equal angular spacing, as seen in FIG. 3.

The flute 32 relating to angle B is wider and deeper than the flute 34 relating to angle A, so as to improve coolant feed and facilitate chip clearance and removal when teeth work with higher feed per teeth compared to equal tooth space dividing (by angle A).

Figure 4A:
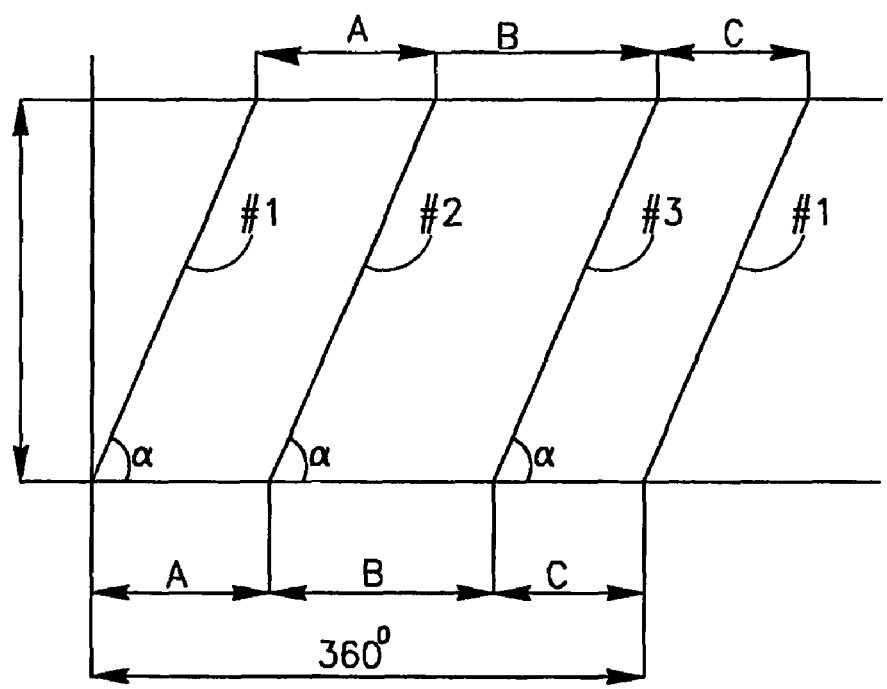
FIG. 4a is a diagram of 3-flute end mill with a constant flute helix angle in each tooth and a constant flute helix angle from tooth to tooth.

FIG. 4a is a diagram of a 3-flute end mill with a constant flute helix angle in each tooth and a constant flute helix angle from tooth to tooth.

Figure 4B:
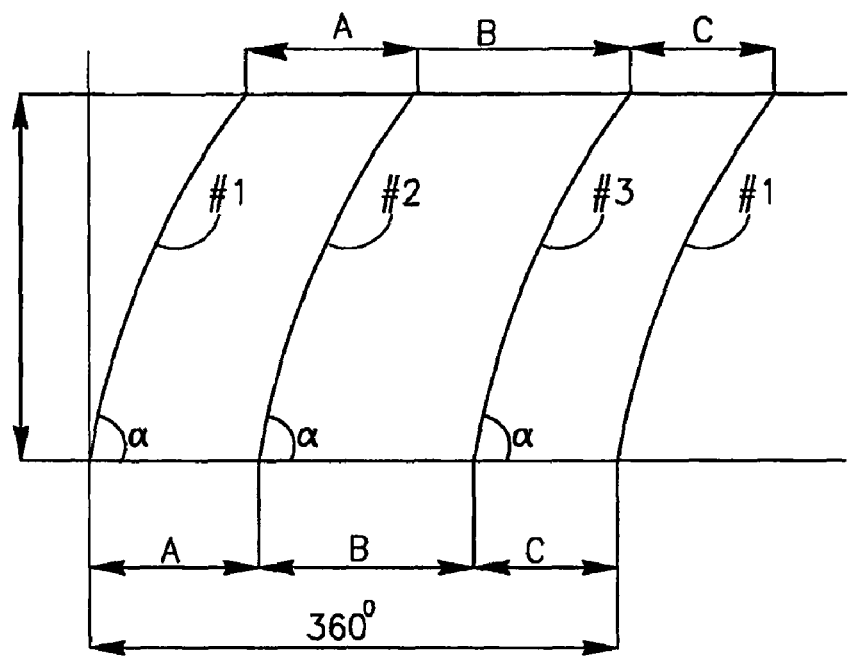
FIG. 4b is a diagram of 3-flute end mill with a variable flute helix angle from low to high in each tooth and the same variability of flute helix angle from tooth to tooth.

FIG. 4b is a diagram of a 3-flute end mill with a variable flute helix angle from low to high in each tooth and the same variability of flute helix angle from tooth to tooth.

Figure 4C:
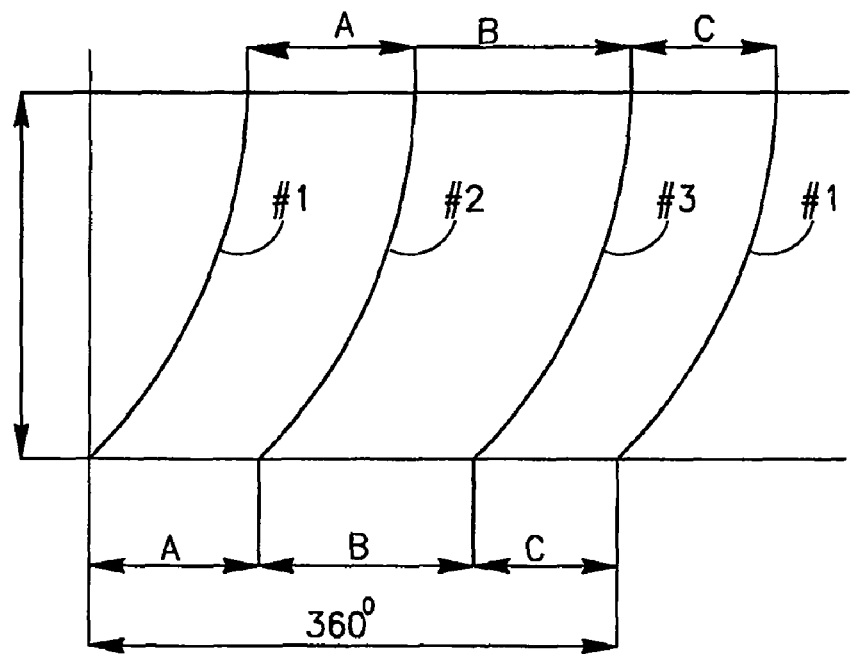
FIG. 4c is a diagram of 3-flute end mill with a variable flute helix angle from high to low in each tooth and the same variability of flute helix angle from tooth to tooth.

FIG. 4c is a diagram of a 3-flute end mill with a variable flute helix angle from high to low in each tooth and the same variability of flute helix angle from tooth to tooth.

Figure 5:
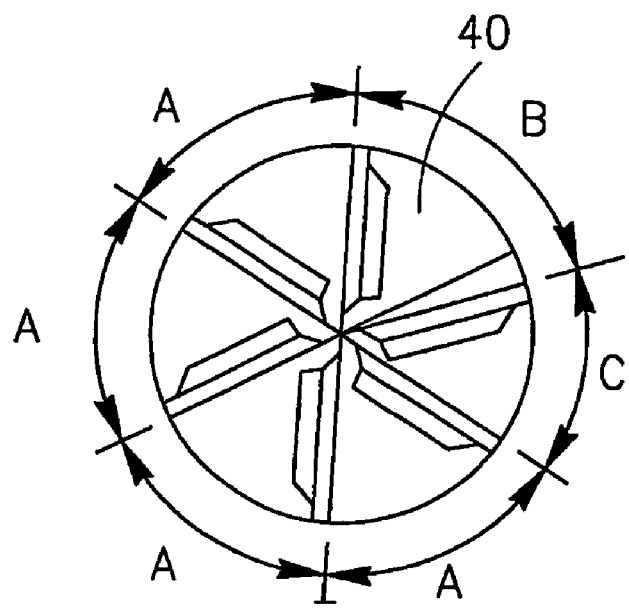
FIG. 5 is an end view of a six-tooth end mill according to at least one embodiment.

FIG. 5 shows a six-tooth end mill 40 wherein four of the cutting edge spans A are equally spaced (A=60 E) while the remaining two spans B and C are irregular and in combination cover the remaining 120 E.

Figure 6:
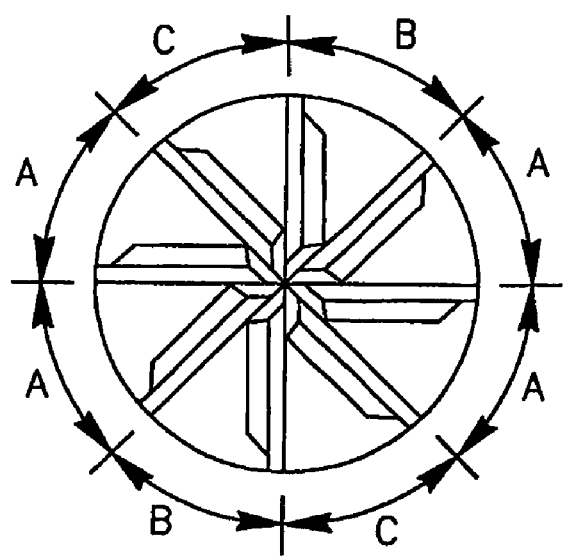
FIG. 6 is an end view of an eight-tooth end mill according to at least one embodiment having two separate teeth off-set from the equally-divided location and two groups of equally-spaced teeth.

FIG. 6 illustrates an eight-tooth end mill 42. Two groups of regular spans A alternate with two groups of irregular spaced teeth B and C.

Other cutting tools and components thereof are disclosed in the following U.S. Patents and published U.S. Patent Applications: U.S. Pat. No. 6,991,409 to Noland; U.S. Pat. No. 4,497,600 to Kishimoto; U.S. Pat. No. 4,963,059 to Hiyama; US 2005/0105973 to MacArthur; US 2005/0084341 to Long, II et al.; and US 2005/0117982 to Dov et al. Another cutting tool is shown in a 2003 Kennametal Inc. brochure no. HAN03040B. The preceding publications, as well as all other publications mentioned herein, are hereby incorporated by reference as if set forth in their entirety herein.

The scope of the described embodiments is intended to include all embodiments coming within the meaning of the following claims. The foregoing examples illustrate useful forms of an embodiment or embodiments, but are not to be considered as limiting the scope thereof, as those skilled in the art will be aware that additional variants and modifications can readily be formulated without departing from the meaning of the following claims.

What is claimed is:

1. A chatter-resistant end mill or shell mill or bur, comprising a shank portion and at least one cutting portion divided into a plurality of teeth by flutes disposed between said teeth, each tooth having at least one cutting edge, wherein a first angle separating said cutting edge of a first tooth from the cutting edge of a second tooth adjacent in a clockwise direction is different from a second angle separating said cutting edge of said first tooth from the cutting edge of a tooth adjacent in an anti-clockwise direction, wherein each flute is disposed at a constant helix angle along the length of each flute, and wherein all of the flutes are disposed at the same helix angle.

2. The end mill as claimed in claim 1, wherein the difference between said first and said second angles is in the range of 0.2-60 degrees.

3. The end mill as claimed in claim 1, wherein the difference between said first and said second angles is in the range of 0.2-30 degrees.

4. The end mill as claimed in claim 1, wherein the width and depth of all flutes in said cutting portion is equal.

5. The end mill as claimed in claim 1, wherein a flute is disposed between two adjacent teeth, said adjacent teeth being spaced apart at an angle exceeding the angle which would result from equal angular spacing, said flute being wider and deeper than a second flute appropriate to an equally-spaced pair of adjacent teeth.

6. The end mill as claimed in claim 1, wherein a flute is disposed between two adjacent teeth, said adjacent teeth being spaced apart at an angle less the angle which would result from equal angular spacing, said flute being narrower and shallower than a second flute appropriate to an equally-spaced pair of adjacent teeth.

7. The end mill as claimed in claim 1, wherein at least one group of said cutting edges is displaced from the equally-spaced position and at least one further group has cutting edges positioned in an equally-spaced configuration.

8. The end mill as claimed in claim 1, wherein at least one group of said cutting edges is displaced from the equally-spaced position and at least one further group has cutting edges positioned in an equally-spaced configuration.

9. A chatter-resistant end mill or shell mill or bur, comprising a shank portion and at least one cutting portion divided into a plurality of teeth by flutes disposed between said teeth, each tooth having at least one cutting edge,
- wherein a first angle separating said cutting edge of a first tooth from the cutting edge of a second tooth adjacent in a clockwise direction is different from a second angle separating said cutting edge of said first tooth from the cutting edge of a tooth adjacent in an anti-clockwise direction,
- wherein each flute is disposed at a variable helix angle that varies along the length of each flute,
- wherein all of the flutes are disposed at the same variable helix angle, and
- wherein a flute is disposed between two adjacent teeth, said adjacent teeth being spaced apart at an angle exceeding the angle which would result from equal angular spacing, said flute being wider and deeper than a second flute appropriate to an equally-spaced pair of adjacent teeth.

10. A chatter-resistant end mill or shell mill or bur, comprising a shank portion and at least one cutting portion divided into a plurality of teeth by flutes disposed between said teeth, each tooth having at least one cutting edge,
- wherein a first angle separating said cutting edge of a first tooth from the cutting edge of a second tooth adjacent in a clockwise direction is different from a second angle separating said cutting edge of said first tooth from the cutting edge of a tooth adjacent in an anti-clockwise direction,
- wherein each flute is disposed at a variable helix angle that varies along the length of each flute, and
- wherein all of the flutes are disposed at the same variable helix angle, and
- wherein a flute is disposed between two adjacent teeth, said adjacent teeth being spaced apart at an angle less the angle which would result from equal angular spacing, said flute being narrower and shallower than a second flute appropriate to an equally-spaced pair of adjacent teeth.

\* \* \* \* \*